US012306700B2

(12) United States Patent
Ahuja

(10) Patent No.: US 12,306,700 B2
(45) Date of Patent: May 20, 2025

(54) SYSTEM AND METHOD FOR CORRECTING ERRORS ASSOCIATED WITH USER ACTIONS ON A WEBSITE

(71) Applicant: Bank of America Corporation, Charlotte, NC (US)

(72) Inventor: Neelofar Ahuja, Warwick, PA (US)

(73) Assignee: Bank of America Corporation, Charlotte, NC (US)

( * ) Notice: Subject to any disclaimer, the term of this patent is extended or adjusted under 35 U.S.C. 154(b) by 21 days.

(21) Appl. No.: 18/329,760

(22) Filed: Jun. 6, 2023

(65) Prior Publication Data

US 2024/0411630 A1    Dec. 12, 2024

(51) Int. Cl.
  *G06F 11/00*    (2006.01)
  *G06F 8/30*    (2018.01)
  *G06F 11/07*    (2006.01)

(52) U.S. Cl.
  CPC ............ *G06F 11/0745* (2013.01); *G06F 8/30* (2013.01)

(58) Field of Classification Search
  CPC ..... G06F 11/0745; G06F 11/0793; G06F 8/30
  USPC ...................................................... 714/1–57
  See application file for complete search history.

(56) References Cited

U.S. PATENT DOCUMENTS

| | | | |
|---|---|---|---|
| 8,903,711 B2 | 12/2014 | Lundberg et al. | |
| 9,378,014 B2 | 6/2016 | Wilson et al. | |
| 9,467,808 B2 | 10/2016 | Davis et al. | |
| 9,547,766 B2 | 1/2017 | Turgeman et al. | |
| 9,928,040 B2 | 3/2018 | Tarlow et al. | |
| 10,261,781 B2 | 4/2019 | Balasubramanian et al. | |
| 10,440,050 B1 * | 10/2019 | Neel | H04L 63/145 |
| 10,459,695 B2 | 10/2019 | Hauser | |
| 10,474,815 B2 | 11/2019 | Turgeman | |
| 10,489,126 B2 | 11/2019 | Kumar et al. | |
| 10,541,780 B2 | 1/2020 | Mukkavilli et al. | |
| 10,558,554 B2 | 2/2020 | Bhandarkar et al. | |
| 10,754,925 B2 | 8/2020 | D'Souza et al. | |
| 11,023,828 B2 | 6/2021 | Puzicha et al. | |
| 11,650,900 B2 * | 5/2023 | Powers | G06F 11/3471 714/45 |
| 11,657,095 B1 * | 5/2023 | Wu | G06F 16/90332 704/9 |
| 11,775,346 B2 * | 10/2023 | Mathew | H04L 67/34 714/38.1 |
| 2002/0062393 A1 * | 5/2002 | Borger | H04L 9/40 709/219 |
| 2011/0066887 A1 * | 3/2011 | Bassin | G06Q 10/06 714/27 |
| 2011/0289481 A1 * | 11/2011 | Franklin | G06F 11/3668 717/125 |

(Continued)

*Primary Examiner* — Sarai E Butler

(57) ABSTRACT

A method for correcting errors associated with user actions on a website is disclosed. The method includes communicating between a decision engine and a website to receive event data associated with the user action and formatting information from the website. The method includes comparing the event data to expected result data. The method includes identifying an error associated with the user action based on the comparison of the event data to the expected result data. The method includes retrieving a pre-determined fix to correct the error associated with the user action from pre-determined fixes stored in a database. The method includes applying the pre-determined fix to the formatting information of the website.

20 Claims, 2 Drawing Sheets

(56) References Cited

U.S. PATENT DOCUMENTS

| | | | |
|---|---|---|---|
| 2014/0059388 A1* | 2/2014 | Patiev | G06F 11/0781 |
| | | | 714/E11.029 |
| 2015/0106687 A1* | 4/2015 | McLaughlin | G06Q 30/02 |
| | | | 715/234 |
| 2015/0278060 A1* | 10/2015 | He | G06F 11/273 |
| | | | 714/37 |
| 2018/0150381 A1* | 5/2018 | Sharma | G06F 11/3684 |
| 2018/0373844 A1 | 12/2018 | Ferrandez-Escamez et al. | |
| 2021/0255914 A1* | 8/2021 | Ciabarra, Jr. | G06F 11/079 |
| 2021/0398630 A1 | 12/2021 | Sadeghi et al. | |
| 2023/0195423 A1* | 6/2023 | Katakam | G06V 30/418 |
| 2023/0281068 A1* | 9/2023 | Friedrich | G06F 11/076 |
| | | | 714/57 |

\* cited by examiner

SYSTEM AND METHOD FOR CORRECTING ERRORS ASSOCIATED WITH USER ACTIONS ON A WEBSITE

TECHNICAL FIELD

The present disclosure relates generally to web accessibility and compliance, and more specifically to a system and method for correcting errors associated with user actions on a website.

BACKGROUND

Inaccessible web content can result in people with disabilities being denied equal access to information. People with disabilities navigate the web in a variety of ways. For example, people who are blind may use screen readers, which are devices that speak the text that appears on a screen. People who are deaf or hard of hearing may use captioning. People with mobility disabilities may not be able to navigate the web using a mouse and instead rely on a keyboard or voice control movement.

SUMMARY

The systems and methods described in the present disclosure provide practical applications and technical advantages that overcome the current technical problems described herein. As discussed above, one technical problem associated with website creation is that inaccessible web content means people with disabilities are denied equal access to information. Currently, making websites compliant with the American's with Disabilities Act (ADA) can be expensive and a time-consuming process, and may lead to websites having ADA related issues. Embodiments of the present disclosure are integrated into a practical application that allows the detection and correction of errors associated with user actions on a website. In some instances, the temporary or permanent fixes may be applied in real-time upon detection of the errors associated with the user action. In some embodiments, the provided systems and methods include a decision engine having a processor that is configured to communicate with a web server hosting the website to receive event data associated with a user action (e.g., user pressing a tab key on the website or a space bar) and formatting information of the website (e.g., code for structuring website and performing user actions on the website). The decision engine may be operably coupled to a database configured to store expected result data that comprises an expected result for when a user device performs a user action on the website (e.g., pressing the tab key moves between selectable elements on the website or pressing space bar scrolls down on the website). The database may also store pre-determined fixes that are configured to correct the errors associated with the user action on the website. In some embodiments, once the decision engine receives the event data associated with the user action and the formatting information of the website, the decision engine compares the event data to the expected result data, and identifies an error associated with the user action based on the comparison of the event data to the expected result data. The decision engine is further configured to apply the pre-determined fix to the formatting information of the website to correct the error associated with the user action.

The disclosed systems and methods may also comprise a machine learning module configured to monitor a user's pattern and behavior while accessing the website. The machine learning module may be trained based on feature variables from the event data associated with the user actions to facilitate identifying errors associated with the user actions and applying appropriate pre-determined fixes.

The disclosed systems and methods provide several practical applications and technical advantages. First, the disclosed systems and methods provide real-time identification and correction for errors associated with user actions on the website. Real-time identification and correction of the errors associated with the user actions on the website provides the practical application and technical advantage of allowing users with disabilities to be able to functionally use the website efficiently and gain access to information on the website. Second, the disclosed systems and methods reduce cost and improve turn-around time for correcting the errors associated with the user action. The decision engine allows for the practical application and technical advantage of monitoring user actions on the website and implementing corrections in real-time without necessarily having to report the issue via a ticket to be addressed by personnel associated with the website. The decision engine reduces cost associated with having personnel address the user action errors and improves the speed at which corrections are implemented (e.g., personnel would have to review the ticket and propose an appropriate fix). Third, the machine learning module may monitor user pattern and behavior for various device types and interface types of the website to build a database of pre-determined fixes for each respective device type and interface type of the website.

In one embodiment, the present disclosure provides a system for correcting errors associated with user actions on a website. The system includes a database operable to store expected result data and pre-determined fixes, where the expected result data comprises an expected result for when a user device performs a user action on the website, and where the pre-determined fixes are configured to correct the errors associated with the user action on the website. The system includes a processor operably coupled to the database. The processor is configured to communicate with a web server hosting the website to receive event data associated with the user action and formatting information of the website. The processor is configured to compare the event data to the expected result data, and identify an error associated with the user action based on the comparison of the event data to the expected result data. The processor is configured to retrieve a pre-determined fix to correct the error associated with the user action from the pre-determined fixes stored in the database, and apply the pre-determined fix to the formatting information of the website.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, the present disclosure provides systems and methods for correcting errors associated with user actions on a website. In some embodiments, the provided systems and methods include a decision engine having a processor that is configured to communicate with a web server hosting the website to receive event data associated with the user action (e.g., user pressing a tab key on the website or a space bar) and formatting information of the website (e.g., code for structuring the website and performing user actions on the website). The decision engine may be operably coupled to a database configured to store expected result data that comprises an expected result for when a user device performs a user action on the website (e.g., pressing the tab key moves between selectable elements on the website or pressing space bar scrolls down on the website). The database may also store pre-determined fixes that are configured to correct the errors associated with the user action on the website. Once the processor receives the event data associated with the user action and the formatting information of the website, the processor compares the event data to the expected result data, and identifies an error associated with the user action based on the comparison of the event data to the expected result data. The processor is further configured to apply the pre-determined fix to the formatting information of the website to correct the error associated with the user action.

System Overview

Figure 1:
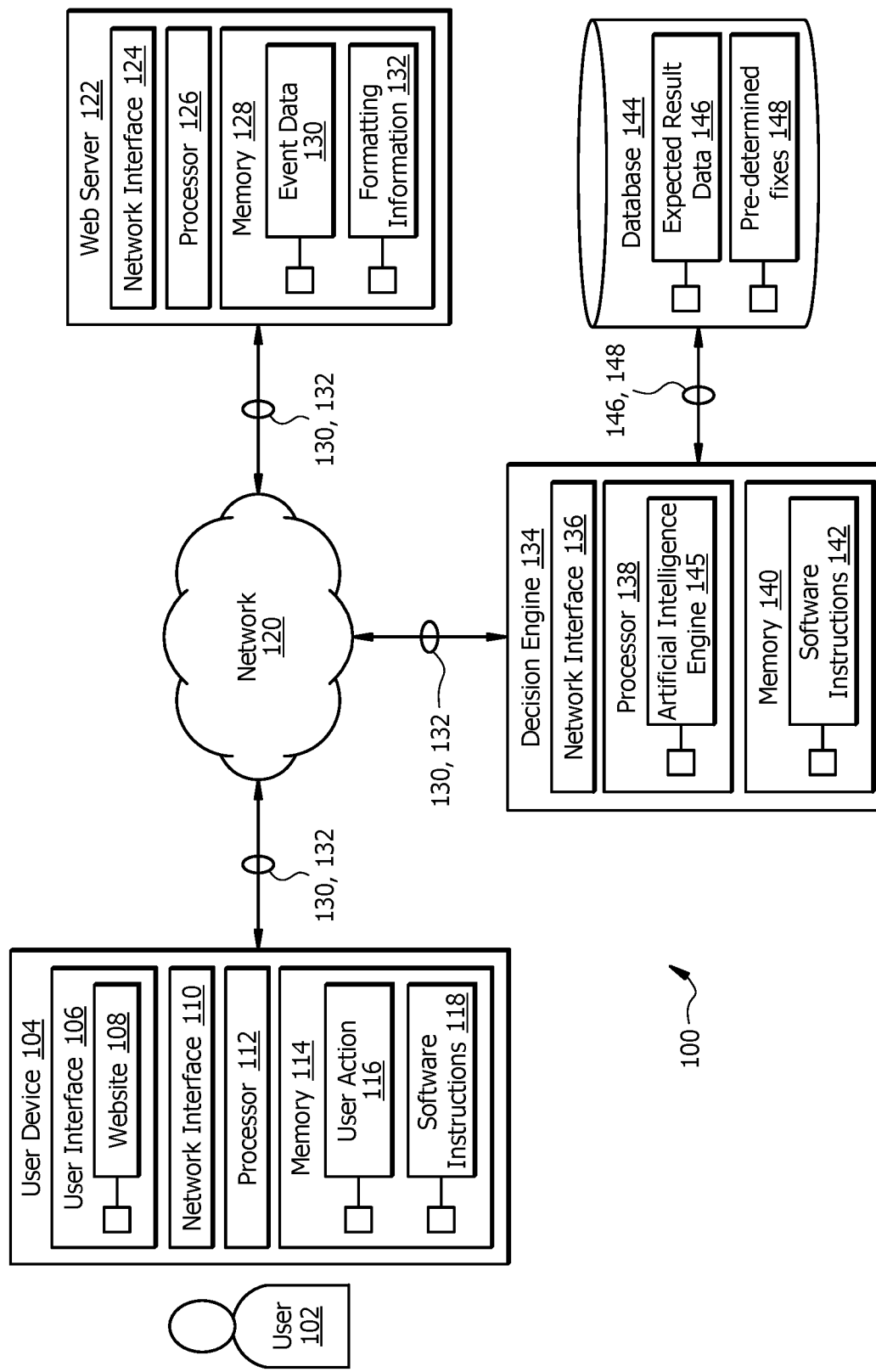
FIG. 1 illustrates an embodiment of a system according to an embodiment of the present disclosure.

FIG. 1 illustrates an embodiment of a system 100 for correcting errors associated with user actions on a website 108. In some embodiments, the system 100 includes a user device 104 operable to interact with a user 102, a network 120, a web server 122 configured to host the website 108, a decision engine 134, and a database 144. In general, the user 102 may utilize the user device 104 to perform one or more user actions 116 on the website 108 hosted by the web server 122. The user device 104 may access the website 108 hosted by the web server 122 via the network 120. The web server 122 may be configured to monitor the user actions 116 performed by the user device 104 using a processor 126 and store the user actions 116 as event data 130 in a memory 128. The memory 128 of the web server 122 is further configured to store formatting information 132 associated with the website 108, which may include code for structuring the website 108 and code for implementing the user actions 116.

The decision engine 134 includes a processor 138 that is configured to communicate with the web server 122 via the network 120. The decision engine 134 is configured to receive the event data 130 associated with the user actions 116 (e.g., a user 102 pressing a tab key or a space bar using the user device 104 on the website 108) and receive the formatting information 132 from the web server 122. The decision engine 134 is operably coupled to the database 144 via network interface 136. The database 144 is configured to store expected result data 146 that comprises an expected result for when a user device 104 performs one or more user actions 116 on a website 108 (e.g., pressing the tab key moves between selectable elements on the website or pressing space bar scrolls down on the website). The database 144 is further configured to store pre-determined fixes 148 that are configured to correct errors associated with the user actions 116 on the website 108. Once the decision engine 134 receives the event data 130 associated with the user actions 116 and the formatting information 132 via the network 120, the decision engine 134 compares the event data 130 to the expected result data 146 to identify the presence of any errors associated with the user actions 116 based on the comparison of the event data 130 to the expected result data 146. For example, an error associated with the user actions 116 may be that when a user 102 presses the tab key it results in no action, or results in an action other than moving between selectable elements on the website 108, as expected. Once an error has been identified, the decision engine 134 is further configured to apply the pre-determined fix 148 from the database 144 to the formatting information 132 of the website to correct the error associated with the user actions 116.

System Components

User Device

User device 104 is generally any device configured to perform user actions 116 on a website 108, as well as interact with the user 102. In some embodiments, the user device 104 is in signal communication with the web server 122 hosting the website 108 via the network 120. The user device 104 may have a user device type, which may include, but is not limited to, a computer (e.g., personal computer, desktop, workstation, laptop), a server, an electronic tablet device, or mobile phone (e.g., smartphone). Particular non-limiting examples of user device types for the user devices 104 may include a computer, mobile phone, tablet, or the like). The user device 104 may include a user interface 106. The user interface 106 may include a display for displaying the website 108, a microphone, a mouse, a keypad, or other appropriate terminal equipment for performing user actions 116 of the user 102. In some embodiments, the user device 104 may display the website according to an interface type that includes a particular web browser.

The user device 104 may include a processor 112, a memory 114, and a network interface 110 configured to enable wired and/or wireless communications between the network 120 and the user device 104, as well as other components in the system 100. Suitable network interfaces 110 include a WIFI interface, a local area network (LAN) interface, a wide area network (WAN) interface, a modem, a switch, or a router. The network interface 110 may be configured to use any suitable type of communication protocol as would be appreciated by one of ordinary skill in the art.

The processor 112 of the user device 104 is configured to send and receive data using the network interface 110. The processor 112 is operatively coupled to the memory 114. The memory 114 may be a non-transitory computer readable medium. For example, the memory 114 may be volatile or non-volatile and may comprise a read-only memory (ROM), random-access memory (RAM), ternary content-addressable memory (TCAM), dynamic random-access memory (DRAM), and static random-access memory (SRAM). The memory 114 may be implemented using one or more disks, tape drives, solid-state drives, and/or the like. The memory 114 is operable to store software instructions 118 and code for implementing the user actions 116. The software instructions 118 may comprise any suitable set of instructions, logic rules or code operable to execute the processor 112 to perform the operations of the user device 104 described herein. Exemplary code for implementing the user action 116 may include, but is not limited to, code for operating a tab key on a website 108 using the user device 104, code for operating a space bar on the website 108 using the user device 104, code for operating an arrow key on the website 108 using the user device 104, code for converting digital text on the website 108 into audible and/or tactile form using the user device 104 (e.g., screen reader), code for converting video audio into text-based closed captions on the website 108 using the user device 104 (e.g., web captioner).

The processor 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 112 may be implemented in cloud devices, servers, virtual machines, and the like. The processor 112 may be a programmable logic device, a microcontroller, a microprocessor, or any suitable combination of the preceding. The processor 112 is configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations, registers the supply operands to the ALU and store the results of ALU operations, and a control unit that fetches instructions from memory 114 and executes them by directing the coordinated operations of the ALU, registers and other components. The processor 112 is configured to implement various instructions. For example, the processor 112 is configured to execute instructions from the memory 128 (e.g., software instructions 118 and user actions 116) to implement the functions of the processor 112. In this way, processor 112 may be a special-purpose computer designed to implement the functions disclosed herein. In an embodiment, the processor 112 is implemented using logic units, FPGAs, ASICs, DSPs, or any other suitable hardware.

In some embodiments, the processor 112 is configured to perform one or more user actions 116 on the website 108. For example, the processor 112 may be configured to perform user actions 116 that include, but not limited to, pressing a tab key on the website 108 to move between selectable elements on the website 108, pressing a space bar to scroll down on the website 108, pressing an arrow key to scroll in a direction of the respective arrow key on the website 108, converting digital text on the website 108 to an audible and/or tactile form using the user interface 106 of the user device 104, or converting video audio into text-based closed captions on the website 108 using the user interface 106 of the user device 104.

Network

Network 120 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 120 may be configured to support any suitable type of communication protocol as would be appreciated by one of ordinary skill in the art.

Web Server

The web server 122 is generally configured to host the website 108 and is configured to store event data 130 associated with the user actions 116 and formatting information 132 of the website 108 in a memory 128. The web server 122 comprises a network interface 124 that is configured to enable wired and/or wireless communications between the web server 122 and the network 120, as well as other components in the system 100, such as the user device 104 and the decision engine 134. Suitable network interfaces 124 include a WIFI interface, a local area network (LAN) interface, a wide area network (WAN) interface, a modem, a switch, or a router. The network interface 124 may be configured to use any suitable type of communication protocol as would be appreciated by one of ordinary skill in the art.

The web server 122 includes a processor 126. The processor 126 of the web server 122 is configured to send and receive data using the network interface 124. The processor 126 is operatively coupled to the memory 128. The memory 128 may be a non-transitory computer readable medium. For example, the memory 128 may be volatile or non-volatile and may comprise a read-only memory (ROM), random-access memory (RAM), ternary content-addressable memory (TCAM), dynamic random-access memory (DRAM), and static random-access memory (SRAM). The memory 128 may be implemented using one or more disks, tape drives, solid-state drives, and/or the like. The memory 128 is operable to store event data 130 associated with user action 116 and formatting information 132 of the website 108.

Exemplary event data 130 associated with user actions 116 may include, but is not limited to, event data 130 associated with a user 102 pressing a tab key on the website 108 using the user device 104, event data 130 associated with the user 102 pressing a space bar on the website 108 using the user device 104, event data 130 associated with the user 102 pressing an arrow key on the website 108 using the user device 104, event data 130 associated with the user 102 requesting conversion of digital text on the website 108 into audible and/or tactile form using the user device 104, event data 130 associated with the user 102 requesting conversion of video audio into text-based closed captions on the website 108 using the user device 104, or the like. Exemplary formatting information 132 of the website 108 may include code for structuring the website 108 (e.g., website layout) and code for performing user actions 116 on the website 108. Exemplary formatting information 132 may include, but is not limited to, Hyper Text Markup Language (HTML) code, Cascading Style Sheets (CSS) code, Javascript code, Structured Query Language (SQL) code, Python code, Bootstrap code, or the like.

The processor 126 is any is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 126 may be implemented in cloud devices, servers, virtual machines, and the like. The processor 126 may be a programmable logic device, a microcontroller, a microprocessor, or any suitable combination of the preceding. The processor 126 is configured to process data and may be implemented in hardware or software. For example, the processor 126 may be 8-bit, 16-bit, 32-bit, 64-bit, or of any other suitable architecture. The processor 126 may include an arithmetic logic unit (ALU) for performing arithmetic and logic operations, registers the supply operands to the ALU and store the results of ALU operations, and a control unit that fetches instructions from memory 128 and executes them by directing the coordinated operations of the ALU, registers and other components. The processor 126 is configured to implement various instructions. For example, the processor 126 is configured to execute instructions from the memory to implement the functions of the processor 126. In this way, processor 126 may be a special-purpose computer designed to implement the functions disclosed herein. In an embodiment, the processor 126 is implemented using logic units, FPGAs, ASICs, DSPs, or any other suitable hardware.

In some embodiments, the processor 126 of the web server 122 is configured to record event data 130 associated with the user actions 116 being performed on the website 108. For example, the user 102 may use the user device 104 to perform the exemplary user action 116 of pressing a tab key on the website 108. For example, pressing the tab key may result in a correct event where a cursor moves between selectable elements on the website 108. The processor 126 is configured to record data associated with this correct user action 116 as the event data 130. In another example, pressing the tab key may result in an incorrect event for the user action 116 (e.g., no action occurs as a result of pressing tab or the wrong action occurs, such as scrolling down on the website 108). The processor is configured to record data associated with this incorrect user action 116 as the event data 130. The event data 130 is stored in the memory 128.

Database

The database 144 may be any storage architecture. Examples of the database 144 may include a data store, a data warehouse, a network-attached storage cloud, a storage area network, and any storage assembly directly (or indirectly) coupled to the decision engine 134 via the network interface 136, or any one or more components in the system 100. The database 144 is configured to store expected result data 146 and pre-determined fixes 148.

In some embodiments, the expected result data 146 comprises an expected result for when a user device 104 performs one or more user actions 116 on the website 108. For example, the expected result data 146 for the user 102 pressing a tab key on the website 108 using the user device 104 includes moving a cursor between selectable elements on the website 108; the expected result data 146 of for the user 102 pressing space bar on the website 108 using the user device 104 includes scrolling down on the website 108; the expected result data 146 of the user 102 pressing an arrow key on the website 108 includes scrolling in a direction of the respective arrow key on the website 108; the expected result data 146 of a user 102 requesting conversion of digital text on the website 108 using the user device 104 includes converting the digital text into audible and/or tactile form using the user device 104; and the expected result data 146 of a user 102 requesting conversion of video audio on the website includes converting the video audio into text-based closed captions on the website 108.

In some embodiments, the pre-determined fixes 148 are configured to correct the errors associated with the user actions 116 on the website 108. The pre-determined fix 148 may include code that performs the intended expected result of the user actions 116. The code of the pre-determined fix 148 may be in any suitable format including, but not limited to, Hyper Text Markup Language (HTML) code, Cascading Style Sheets (CSS) code, Javascript code, Structured Query Language (SQL) code, Python code, Bootstrap code, or the like. In some embodiments, the pre-determined fix 148 is configured to alter or otherwise replace the formatting information 132 of the website 108 to correct the error associated with the user actions 116.

In some embodiments, the errors associated with user actions 116 on the website 108 and associated pre-determined fixes 148 may depend on both the user device type of the user device 104 and the interface type of the website 108. For example, using a pre-determined fix 148 to correct an error associated with pressing an arrow key on a computer may have a different pre-determined fix 148 compared to correcting an error associated with pressing an arrow key on an electronic tablet, even if the same interface or browser type is used for the website 108. In another example, using a pre-determined fix 148 to correct an error associated with pressing an arrow key on a website 108 using a particular internet browser as the interface type may have a different pre-determined fix 148 compared to correcting an error associated with pressing an arrow key on a website 108 using a different internet browser as the interface type, even if the same device type (e.g., computer) is used. In other words, the database 144 may include pre-determined fixes 148 that are configured to correct errors associated with a particular device type of the user device 104 and/or the interface type of the website 108.

Decision Engine

The decision engine 134 includes a network interface 136 and a processor 138. The network interface 136 that is configured to enable wired and/or wireless communications between the decision engine 134 and the network 120, as well as other components in the system, such as the web server 122 and the database 144. Suitable network interfaces 136 include a WIFI interface, a local area network (LAN) interface, a wide area network (WAN) interface, a modem, a switch, or a router. The network interface 136 may be configured to use any suitable type of communication protocol as would be appreciated by one of ordinary skill in the art.

The processor 138 is operatively coupled to the memory 140. The memory 140 may be a non-transitory computer readable medium. For example, the memory 140 may be volatile or non-volatile and may comprise a read-only memory (ROM), random-access memory (RAM), ternary content-addressable memory (TCAM), dynamic random-access memory (DRAM), and static random-access memory (SRAM). The memory 140 may be implemented using one or more disks, tape drives, solid-state drives, and/or the like. The memory 140 is operable to store software instructions 142. The software instructions 142 may comprise any suitable set of instructions, logic rules or code operable to execute the processor 138 to perform the operations of the decision engine 134 described herein.

The processor 138 is any is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 138 may be implemented in cloud devices, servers, virtual machines, and the like. The processor 138 may be a programmable logic device, a microcontroller, a microprocessor, or any suitable combination of the preceding. The processor 138 is configured to process data and may be implemented in hardware or software. For example, the processor 138 may be 8-bit, 16-bit, 32-bit, 64-bit, or of any other suitable architecture. The processor 138 may include an arithmetic logic unit (ALU) for performing arithmetic and logic operations, registers the supply operands to the ALU and store the results of ALU operations, and a control unit that fetches instructions from database 144 and executes them by directing the coordinated operations of the ALU, registers and other components. The processor 138 is configured to implement various instructions. For example, the processor 138 is configured to execute instructions from the database to implement the functions of the processor 138. In this way, processor 138 may be a special-purpose computer designed to implement the functions disclosed herein. In an embodiment, the processor 138 is implemented using logic units, FPGAs, ASICs, DSPs, or any other suitable hardware.

In some embodiments, the processor 138 is configured to communicate with the web server 122 to receive event data 130 associated with the user actions 116 and formatting information 132. The processor 138 is further configured to communicate with the database 144 to receive the expected result data 146 and the pre-determined fixes 148. The processor 138 is further configured to compare the event data 130 to the expected result data 146 to identify the presence of an error associated with the user actions 116 based on the comparison of the event data 130 to the expected result data 146. In some embodiments, comparing the event data 130 to the expected result data 146 includes determining a similarity score that quantifies the similarity between the event data 130 and the expected result data 146, and comparing the similarity score to a threshold value. If the similarity score is below the threshold value, the error associated with the user actions 116 is identified by the processor 138. Any suitable similarity score may be used including, but not limited to, K-means clustering, Hierarchical clustering, cosine similarity, kernel function, Euclidean distance, Manhattan distance, Minkowski distance, or the like. Once the error is identified, the processor 138 is configured to apply the pre-determined fix 148 to the formatting information 132 of the website to correct the error associated with the user actions 116.

In some embodiments, the processor 138 includes an artificial intelligence (AI) engine 145. The AI engine 145 may be implemented using software instructions 142 executed by the processor 138. The AI engine 145 may monitor user 102 pattern and behavior on the website 108 and facilitate in identifying errors associated with user actions 116. In some embodiments the AI engine 145 compares the event data 130 to the expected result data 146 to identify an error associated with the user action based on the comparison of the event data 130 to the expected result data 146. The AI engine 145 may be implemented by a machine learning neural network. In some embodiments, the AI engine 145 is trained based on feature variables that are previously acquired in the event data 130 to identify the error. Further, in some embodiments, the AI engine 145 is trained based on pre-determined fixes 148 in the database 144 to identify which pre-determined fixes 148 correct the errors associated with the user actions 116.

System Operation

Figure 2:
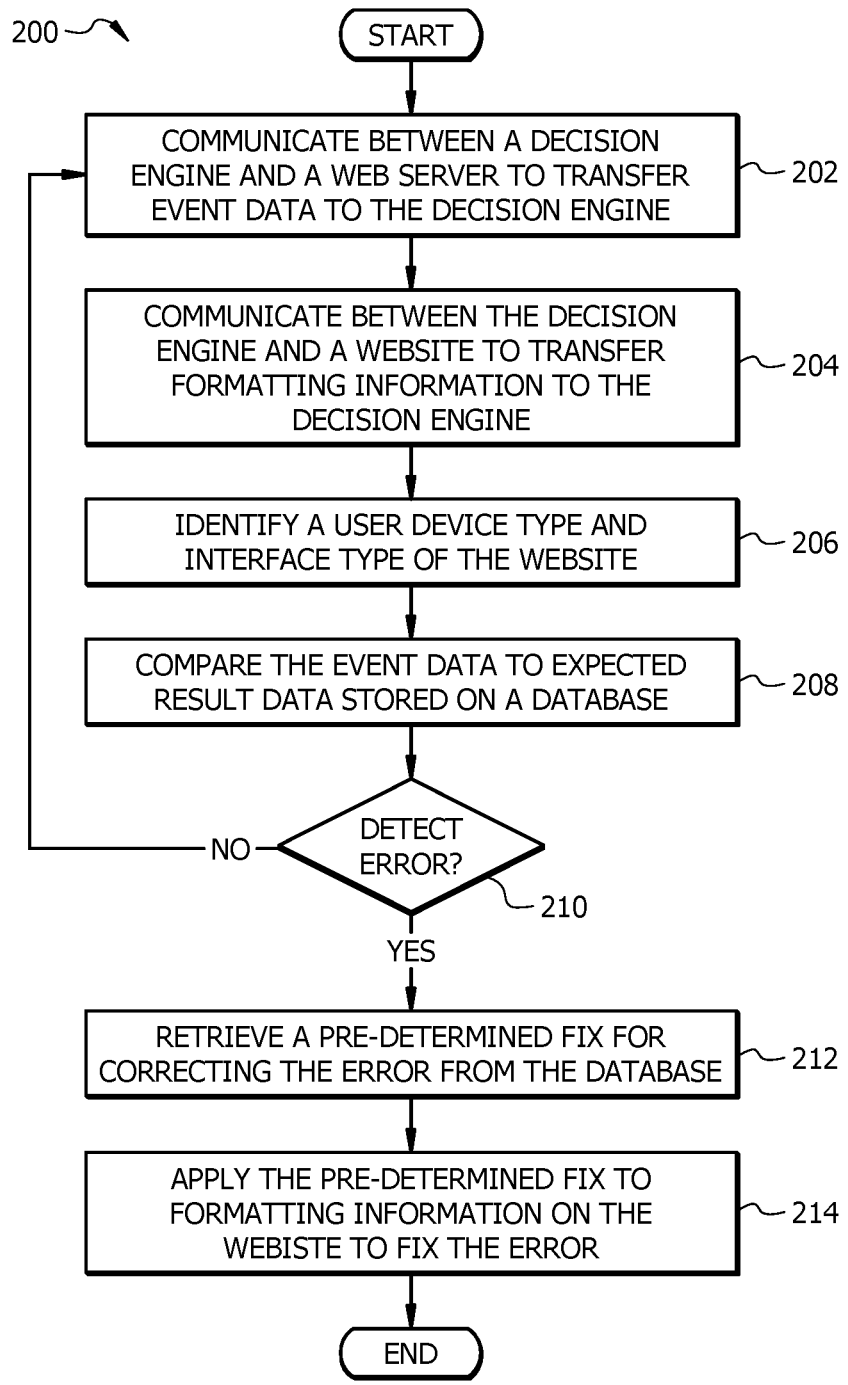
FIG. 2 illustrates a flowchart of a method according to an embodiment of the present disclosure.

FIG. 2 illustrates an operational flow 200 of the system of FIG. 1 for correcting errors associated with user actions 116 on the website. The operational flow 200 can be logically described in two parts. The first part includes operations 202-208, which are generally directed to the decision engine 134 communicating with the web server 122 and the database 144 to acquire event data 130 associated with the user actions 116, formatting information 132 of the website 108, and expected result data 146. The first part further includes using the decision engine 134 to compare the event data 130 associated with the user actions 116 to the expected result data 146 in the database 144 to identify an error associated with the user actions 116. The second part includes operations 212-214, which are generally directed to retrieving a pre-determined fix 148 from the database 144 and applying the pre-determined fix to the formatting information 132 of the website 108 to fix the error.

In operation, the operational flow 200 may begin at operation 202 where the decision engine 134 communicates with a web server 122 to receive event data 130 associated with the user actions 116, and at operation 204 the decision engine 134 may receive formatting information 132 of the website 108 from the web server 122. At operation 206, the decision engine 134 may further communicate with the web server 122 to receive a device type of the user device 104 that performed user actions 116 on the website 108 and an interface type of the website 108. For example, the decision engine 134 may identify the user device 104 that performed the user actions 116 on the website as being a computer, an electronic tablet device or a mobile phone, and may further identify the interface type as being a particular web browser. As discussed above, the pre-determined fix 148 for correcting an error associated with the user actions 116 may depend on either or both the user device type of the user device 104 and the interface type of the website 108.

At operation 208, the decision engine 134 compares the event data 130 to the expected result data 146 to identify an error associated with the user actions 116 based on the comparison of the event data 130 to the expected result data 146. At decision block 210, detects the presence or absence of the error associated with the user actions 116. For example, comparing the event data 130 to the expected result data 146 may include determining a similarity score that quantifies the similarity between the event data 130 and the expected result data 146. The similarity score may be compared to a threshold value to determine the presence or absence of the error associated with the user actions 116. In some embodiments, operation 208 further includes identifying the error associated with the user actions 116 based on the device type of the user device and the interface type of the website. If the similarity score is below the threshold value, the error associated with the user actions 116 is identified by the decision engine 134, and the operational flow 200 proceeds to operation 210. Conversely if the similar score is above the threshold value, an absence of an error is determined by the decision engine 134, and operation may be returned to operations 202-208.

At operation 212, the decision engine retrieves a pre-determined fix 148 from the database 144 to correct the error associated with the user actions 116. The pre-determined fix 148 may include code that performs the intended expected result of the user actions 116. For example, the pre-determined fix 148 may include code for pressing a tab key on the website 108 that results in moving the cursor between selectable elements on the website 108, the pre-determined fix 148 may include code for pressing space bar on the website 108 that results in scrolling down on the website 108, the pre-determined fix 148 may include code for an arrow key on the website 108 that results in scrolling in a direction of the respective arrow key on the website 108, the pre-determined fix 148 may include code for converting digital text on the website 108 into audible and/or tactile form, and the pre-determined fix may include code for converting video audio on the website 108 into text-based closed captions on the website 108. The code may vary and depend on the user device type of the user device 104 and the interface type of the website 108, as discussed above.

At operation 214, the decision engine 134 applies the pre-determined fix 148 to the formatting information 132 on the website 108. For example, applying the pre-determined fix 148 to the formatting information 132 may include altering or replacing the formatting information 132 on the website 108 to correct the error associated with the user actions 116.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for correcting errors associated with user actions on a website, the system comprising:
 a database operable to store expected result data and pre-determined fixes, wherein the expected result data comprises an expected result for when a user device performs a user action on the website, and wherein one or more pre-determined fixes are configured to correct one or more errors associated with the user action on the website;
 a processor operably coupled to the database and configured to:
  communicate with a web server hosting the website to receive event data associated with the user action and formatting information of the website, wherein the formatting information includes information associated with structuring a layout of the website;
  compare the event data to the expected result data by determining a similarity score that quantifies the similarity between the event data and the expected result data, and by comparing the similarity score to a threshold value;
  identify an error associated with the user action based on the comparison of the event data to the expected result data such that if the similarity score is below the threshold value, an error is identified;
  retrieve a pre-determined fix from the pre-determined fixes stored in the database, wherein the pre-determined fix comprises code that performs the expected result of the user action on the website; and
  apply the pre-determined fix to the formatting information of the website, wherein applying the pre-determined fix comprises replacing the formatting information to correct the error associated with the user action.

2. The system of claim 1, wherein applying the pre-determined fix to the formatting information of the website includes altering code in the formatting information of the website to correct the error associated with the user action.

3. The system of claim 1, wherein the pre-determined fixes in the database are configured to correct the error associated with a user action for a device type and an interface type of the website, and wherein communicating with the website to receive the event data associated with the user action further comprises identifying the device type of the user device and the interface type of the website.

4. The system of claim 3, wherein identifying the error associated with the user action further comprises identifying the error associated with the user action based on the device type of the user device and the interface type of the website; and
 wherein retrieving the pre-determined fix for correcting the error associated with the user action further comprises retrieving the pre-determined fix associated with the device type and the interface type.

5. The system of claim 3, wherein the user device type is selected from a computer, an electronic tablet device, and a mobile phone, and wherein the interface type is a web browser.

6. The system of claim 1, wherein the event data associated with the user action is selected from event data associated with a user pressing a tab key on the website using the user device, event data associated with the user pressing a space bar on the website using the user device, event data associated with the user pressing an arrow key on the website using the user device, event data associated with the user requesting conversion of digital text on the website into audible or tactile form, and event data associated with the user requesting conversion of video audio into text-based closed captions on the website; and
 wherein the expected result data for pressing the tab key moves a cursor between selectable elements on the website, the expected result data for pressing the space bar scrolls down on the website, and the expected result data for pressing the arrow key scrolls in a direction of the respective arrow key on the website.

7. The system of claim 1 further comprising a machine learning module that compares the event data to the expected result data to identify the error associated with the user action based on the comparison of the event data to the expected result data, wherein the machine learning module is trained based on feature variables from the event data.

8. A method for correcting errors associated with user actions on a website, the method comprising:
 communicating between a decision engine and a website, wherein the decision engine receives event data associated with a user action and formatting information of the website, wherein the formatting information includes information associated with structuring a layout of the website;
 comparing, using the decision engine, the event data to expected result data that are stored in a database, wherein the expected result data comprises an expected result for when a user device performs a user action on the website, and comparing comprises determining a similarity score that quantifies the similarity between the event data and the expected result data, and comparing the similarity score to a threshold value;

identifying, using the decision engine, an error associated with the user action based on the comparison of the event data to the expected result data such that if the similarity score is below the threshold value, an error is identified;

retrieving, using the decision engine, a pre-determined fix to correct the error associated with the user action from pre-determined fixes stored in the database, wherein the pre-determined comprises code that performs the expected result of the user action on the website; and applying, using the decision engine, the pre-determined fix to the formatting information of the website, wherein applying the pre-determined fix comprises replacing the formatting information to correct the error associated with the user action.

9. The method of claim 8, wherein applying the pre-determined fix to the formatting information of the website includes altering code in the formatting information of the website to correct the error associated with the user action.

10. The method of claim 8, wherein communicating with the website to receive the event data associated with the user action further comprises identifying a device type of the user device and an interface type of the website.

11. The method of claim 10, wherein identifying the error associated with the user action further comprises identifying the error associated with the user action based on the device type and the interface type; and wherein retrieving the pre-determined fix for correcting the error associated with the user action is further based on the device type and the interface type.

12. The method of claim 10, wherein the user device type is selected from a computer, an electronic tablet device, a mobile phone, and wherein the interface type is a web browser.

13. The method of claim 8, wherein the user action is selected from pressing a tab on the user device, pressing a space bar on the user device, and pressing an arrow key on the user device, wherein the expected result data for pressing the tab moves a cursor between selectable elements on the website, the expected result data for pressing the space bar scrolls down on the website, and the expected result data for pressing the arrow key scrolls in a direction of the respective arrow key on the website.

14. The method of claim 8, wherein the decision engine is in communication with a machine learning module, and wherein comparing the event data to the expected result data to identify the error associated with the user action based on the comparison of the event data to the expected result data is performed using the machine learning module, and wherein the machine learning module is trained based on features variables from the event data.

15. A non-transitory computer-readable medium storing instructions that when executed by a processor cause the processor to:

communicate with a website to receive event data associated with a user action and formatting information of a website, wherein the formatting information includes information associated with structuring a layout of the website;

compare the event data to expected result data stored in a database, wherein the expected result data comprises an expected result for when a user device performs a user action on the website, and wherein comparing comprises determining a similarity score that quantifies the similarity between the event data and the expected result data, and comparing the similarity score to a threshold value;

identify an error associated with the user action based on the comparison of the event data to the expected result data such that if the similarity score is below the threshold value, an error is identified;

retrieve a pre-determined fix stored on the database to correct the error associated with the user action from pre-determined fixes stored in the database, wherein the pre-determined comprises code that performs the expected result of the user action on the website; and apply the pre-determined fix to the formatting information of the website, wherein applying the pre-determined fix comprises replacing the formatting information to correct the error associated with the user action.

16. The non-transitory computer-readable medium of claim 15, wherein applying the pre-determined fix to the formatting information of the website includes altering code in the formatting information of the website to correct the error associated with the user action.

17. The non-transitory computer-readable medium of claim 15, wherein the pre-determined fix is configured to correct the error associated with the user action for a device type and an interface type of the website, and wherein communicating with the website to receive the event data associated with the user action further comprises identifying the device type of the user device and the interface type of the website.

18. The non-transitory computer-readable medium of claim 17, wherein identifying the error associated with the user action further comprises identifying the error associated with the user action based on the device type of the user device and the interface type of the website; and wherein retrieving the pre-determined fix for correcting the error associated with the user action is further based on the device type and the interface type.

19. The non-transitory computer-readable medium of claim 17, wherein the user device type is selected from a computer, an electronic tablet device, a mobile phone, and wherein the interface type is a web browser.

20. The non-transitory computer-readable medium of claim 15, wherein the user action is selected from pressing a tab on the user device, pressing a space bar on the user device, and pressing an arrow key on the user device, wherein the expected result data for pressing the tab moves a cursor between selectable elements on the website, the expected result data for pressing the space bar scrolls down on the website, and the expected result data for pressing the arrow key scrolls in a direction of the arrow key on the website.

* * * * *